United States Patent
Reed et al.

(10) Patent No.: US 11,273,610 B2
(45) Date of Patent: Mar. 15, 2022

(54) MANUFACTURING METHODS FOR COMPOSITE DRIVESHAFTS

(71) Applicant: Goodrich Corporation, Charlotte, NC (US)

(72) Inventors: Brayton Reed, Rome, NY (US); Joyel M. Schaefer, Earlville, NY (US); Mark R. Gurvich, Middletown, CT (US); Gianfranco Barbato, Rome, NY (US)

(73) Assignee: Goodrich Corporation, Charlotte, NC (US)

( * ) Notice: Subject to any disclaimer, the term of this patent is extended or adjusted under 35 U.S.C. 154(b) by 392 days.

(21) Appl. No.: 16/360,975

(22) Filed: Mar. 21, 2019

(65) Prior Publication Data

US 2020/0298505 A1   Sep. 24, 2020

(51) Int. Cl.
| | |
|---|---|
| *B29C 69/02* | (2006.01) |
| *B29C 70/32* | (2006.01) |
| *B29C 70/38* | (2006.01) |
| *B29L 31/00* | (2006.01) |
| *F16C 1/02* | (2006.01) |

(52) U.S. Cl.
CPC ............. *B29C 69/02* (2013.01); *B29C 70/32* (2013.01); *B29C 70/382* (2013.01); *B29L 2031/75* (2013.01); *F16C 1/02* (2013.01)

(58) Field of Classification Search
None
See application file for complete search history.

(56) References Cited

U.S. PATENT DOCUMENTS

| | | | | |
|---|---|---|---|---|
| 4,173,128 | A | * 11/1979 | Corvelli | .................. B29C 49/44 464/97 |
| 4,248,062 | A | 2/1981 | Ohta et al. | |
| 4,335,587 | A | * 6/1982 | Thomamueller | ....... B29C 53/30 156/155 |
| 5,211,901 | A | * 5/1993 | Fray | ........................ B29C 53/02 264/167 |
| 5,225,016 | A | * 7/1993 | Sarh | ........................ B29C 53/30 156/156 |
| 5,322,580 | A | 6/1994 | McIntire et al. | |

(Continued)

FOREIGN PATENT DOCUMENTS

| | | |
|---|---|---|
| DE | 102015100774 A1 | 7/2016 |
| FR | 2637536 A | 4/1990 |

(Continued)

OTHER PUBLICATIONS

Extended European Search Report for EP Application No. 19209167.6, dated Jun. 17, 2020, 9 pages.

(Continued)

*Primary Examiner* — Jeffry H Aftergut
(74) *Attorney, Agent, or Firm* — Kinney & Lange, P.A.

(57) ABSTRACT

A flexible composite driveshaft is formed by modifying the shape of a preliminary composite driveshaft. A fiber tape is applied to a temporary mandrel using automated fiber placement to form a preliminary composite driveshaft having a flexible shaft element with an initial geometry. The temporary mandrel from the preliminary composite driveshaft is removed and the initial geometry of the flexible shaft element is modified to form the flexible composite driveshaft having a flexible shaft element with a final geometry.

19 Claims, 4 Drawing Sheets

(56) References Cited

U.S. PATENT DOCUMENTS

| | | | |
|---|---|---|---|
| 5,454,897 A | | 10/1995 | Vaniglia |
| 5,685,933 A | | 11/1997 | Mclain et al. |
| 5,725,434 A | * | 3/1998 | Haben .................... B29C 57/12 |
| | | | 464/181 |
| 6,080,343 A | | 6/2000 | Kaufman et al. |
| 8,298,242 B2 | | 10/2012 | Justis et al. |
| 10,280,969 B2 | | 5/2019 | Remer et al. |
| 2005/0115186 A1 | * | 6/2005 | Jensen .................... B64G 9/00 |
| | | | 52/633 |
| 2010/0065717 A1 | * | 3/2010 | Wilson .................... B32B 5/26 |
| | | | 249/13 |
| 2011/0192528 A1 | | 8/2011 | Kozaki et al. |
| 2012/0283029 A1 | | 11/2012 | Lawrie |
| 2013/0291476 A1 | * | 11/2013 | Broughton, Jr. ......... D04C 1/02 |
| | | | 52/653.2 |
| 2017/0240714 A1 | | 8/2017 | Ahmed et al. |

FOREIGN PATENT DOCUMENTS

| | | |
|---|---|---|
| GB | 2571714 A | 9/2019 |
| WO | WO0166965 A1 | 9/2001 |
| WO | WO2014040871 A1 | 3/2014 |

OTHER PUBLICATIONS

Extended European Search Report for EP Application No. 21152784.1, dated Jun. 23, 2021, 8 pages.

* cited by examiner

MANUFACTURING METHODS FOR COMPOSITE DRIVESHAFTS

BACKGROUND

The present disclosure is related generally to driveshafts and more particularly to a method for manufacturing driveshafts.

Driveshafts are used to connect components to a drive input. Known applications include but are not limited to driveshafts used to drive propellers in aerospace applications. Driveshafts transmit primarily torque and rotation. Driveshafts are generally cylindrical bodies, which can include multiple flexible elements in series that provide bending and/or axial compliances to accommodate angular and axial misalignment and mass imbalance.

Composite driveshafts can provide increased strength and reduced weight as compared to conventional metal designs. However, driveshaft designs and, particularly, the geometry of flexible elements, are limited by current manufacturing methods.

SUMMARY

A flexible composite driveshaft is formed by modifying the shape of a preliminary composite driveshaft. A fiber tape is applied to a temporary mandrel using automated fiber placement to form a preliminary composite driveshaft having a flexible shaft element with an initial geometry. The temporary mandrel from the preliminary composite driveshaft is removed and the initial geometry of the flexible shaft element is modified to form the flexible composite driveshaft having a flexible shaft element with a final geometry.

The present summary is provided only by way of example, and not limitation. Other aspects of the present disclosure will be appreciated in view of the entirety of the present disclosure, including the entire text, claims, and accompanying figures.

Figure 1A:
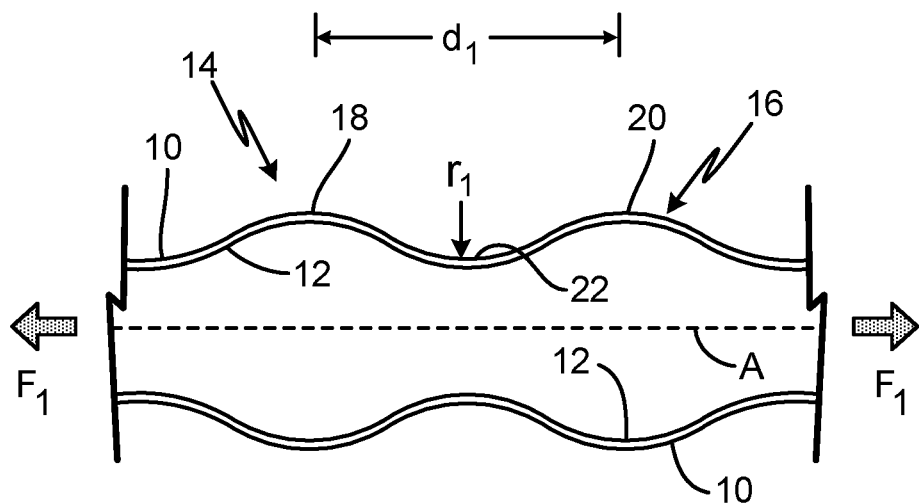
FIG. 1A is a schematic axial cross-sectional representation of a preliminary composite driveshaft during a first phase of a method of the present disclosure in which the preliminary composite driveshaft is formed on a mandrel.

While the above-identified figures set forth embodiments of the present invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features, steps and/or components not specifically shown in the drawings.

DETAILED DESCRIPTION

Automated fiber placement (AFP) can be used to produce high performance composite components in which the positioning of fibers or fiber paths can be locally optimized to meet varying load requirements. AFP is ideally suited for the manufacture of complex driveshafts including multiple flexible elements; however, a relatively sharp angle or small corner radius required between flexible elements cannot be produced using currently available AFP technology due to fabrication limitations, such as, for example, the shape and size of the fiber placement head. The disclosed method uses AFP to produce a composite driveshaft with flexible elements, which are subsequently compressed in a post-treatment process to form a sharp angle or small corner radius between adjacent flexible elements, or other necessary shapes otherwise unachievable by direct one-step AFP-based lay-up alone. In some embodiments, a pre-treatment can also be used to reduce the angle or radius between flexible elements.

Flexible driveshafts can have one or more flexible elements, generally defined by a change in a size of an outer diameter or radial extent of the shaft with a transition radius capable of accommodating bending during operation. Shaft axial and bending flexibility can be increased by increasing the number of flexible elements on the shaft. Two or more flexible elements are illustrated in each of the embodiments disclosed herein. However, it will be understood that a composite driveshaft according to the present disclosure can have a single flexible element, defined by an increase and/or a decrease in the outer diameter or radial extent of the shaft. A small radius or sharp corner between flexible elements or on either side of a single flexible element in a transition region where the flexible element meets the shaft can be required to accommodate bending. As used herein, "sharp corner" refers to a minimum, but non-zero radius. A minimum radius size can be limited by a size and orientation of the fibers used to form the composite shaft and can be set to prevent or reduce fibers breakage. The size of the radius can vary widely depending on the application, applied materials, and fabrication specifics. The method of the present disclosure can be used to create constant and/or variable radii of any size limited only by a need to limit fiber breakage, and is not limited to the designs illustrated herein.

FIG. 1A is a schematic axial cross-sectional representation of a preliminary composite driveshaft during a first phase of a method of the present disclosure in which the preliminary composite driveshaft having flexible elements with an initial geometry is formed on a mandrel. FIG. 1A illustrates preliminary composite driveshaft 10 formed on temporary mandrel 12. An internal surface of preliminary composite driveshaft 10 matches an external surface geometry of temporary mandrel 12. Both preliminary composite driveshaft 10 and temporary mandrel 12 can be generally cylindrical and can include flexible elements 14 and 16, defined by regions of increased shaft diameter with elevations 18 and 20 separated by depression 22. Flexible elements 14 and 16 can be arranged in series along axis A of preliminary composite driveshaft 10, with elevations 18 and 20 extending radially outward from axis A and depression 22 extending radially inward toward axis A. Depression 22 can have a diameter equal to, greater than, or less than a diameter of the shaft. Elevations 18 and 20 and depression 22 can each have an annular shape, extending circumferentially around axis A and separated from one another along axis A. Preliminary composite driveshaft 10 can be symmetric in the axial cross-section about axis A or asymmetric. For example, elevations and depressions that extend partially around axis A are also contemplated as are elevations and depressions having varying radial heights or displacements from axis A about a circumference of the generally cylindrical shaft. Elevations 18 and 20 can form convex or curved protrusions having constant or variable radii that extend from the generally cylindrical preliminary composite driveshaft 10. Elevations with angled peaks are also contemplated. A radius on either side of the each elevation 18 and 20 and between elevations 18 and 20 in depression 22 (i.e., in a transition region where each side of the elevation 18 and 20 meets the shaft), is limited by the shape and size of the AFP fiber placement head and therefore is equal to or greater than a value allowed by the technology. As illustrated in FIG. 1A, depression 22 has a radius $r_1$, which is equal to or greater than a minimum radius for which fibers can be placed using AFP. Radius $r_1$ can set a distance $d_1$, which separates peaks of adjacent elevations 18 and 20. Although, not shown, the radii in the transition regions on opposite sides of elevations 18 and 20 also are equal to or greater than a minimum radius for which fibers can be placed using AFP. Although illustrated as a single radius, radius $r_1$ (of depression 22 or in the transitions regions on either side of elevations 18 and 20) can be constant or variable. It will be understood that the number, shape, composite layup, and location of flexible elements 14 and 16 can be varied and that the geometrical shapes of preliminary composite driveshaft 10 and the final flexible composite driveshaft (shown in FIG. 1B) are not limited to the embodiments shown, but that the disclosed method can be used to form any of a variety of shapes not capable of being formed using current AFP methods alone.

Preliminary composite driveshaft 10 is formed by applying a fiber tape to temporary mandrel 12. The fiber tape can be wrapped around temporary mandrel 12 or otherwise placed to cover temporary mandrel 12. Multiple layers of fiber tape can be applied to temporary mandrel 12 to increase a thickness of preliminary composite driveshaft 10. It will be understood by one of ordinary skill in the art that fiber placement, including fiber direction and layering of fiber tape, can be optimized to meet local load conditions and can vary depending on the intended application. Fiber tape can include but is not limited to carbon, glass, organic fibers, or any of combination thereof, as known in the art. Fiber tape can be pre-impregnated with a thermoset or thermoplastic resin matrix. The material can be fully or partially cured following fiber layup using methods known in the art to provide structural rigidity. When the formation of preliminary composite driveshaft 10 is complete, temporary mandrel 12 can be removed (e.g., by washing or other methods known in the art), leaving the hollow preliminary composite driveshaft 10.

In some embodiments, a load can be applied to temporary mandrel 12 prior to and/or during the application of the fiber tape. As illustrated in FIG. 1A, axial stress can be applied (load $F_1$) to elongate temporary mandrel 12. Load $F_1$ can be applied at ends of temporary mandrel 12 as shown. When the formation of preliminary composite driveshaft 10 is complete, load $F_1$ can be released, which can cause the structure to relax and compress causing the distance $d_1$ between elevations 18 and 20 to shrink and radius $r_1$ of depression 22 to be reduced. In some instances, radius $r_1$ of depression 22 can be reduced to a radius smaller than can be achieved with AFP. When temporary mandrel 12 is subsequently removed, preliminary composite driveshaft 10 can retain the relaxed geometry. In some embodiments, applying load $F_1$ to temporary mandrel 12 can be sufficient to produce the desired final geometry of the flexible composite driveshaft and no further modification is necessary. In other embodiments, applying a load to temporary mandrel 12 can be used to produce an intermediate composite driveshaft (not shown) having flexible elements 14 and 16 of an intermediate geometry different from the initial geometry of preliminary composite driveshaft 10 and the final geometry of flexible composite driveshaft (shown in FIG. 1B).

Figure 1B:
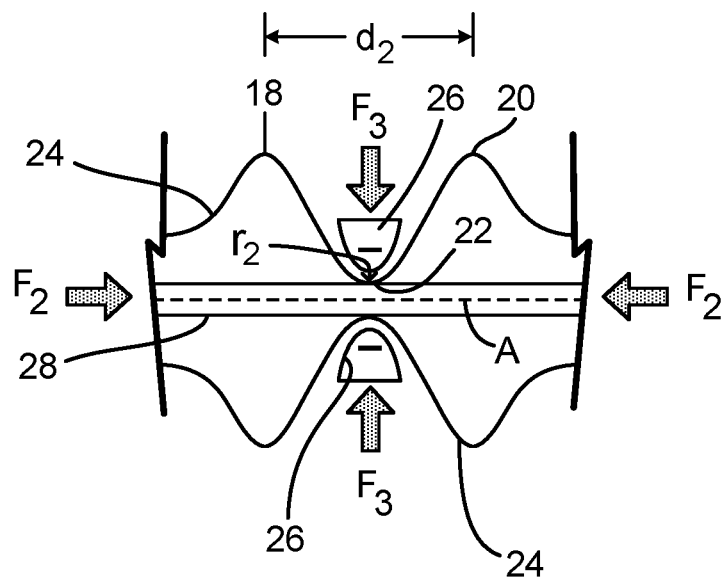
FIG. 1B is a schematic axial cross-sectional representation of the preliminary composite driveshaft during a second phase of the method, illustrating the modification of the shape of the preliminary composite driveshaft of FIG. 1A to form a flexible composite driveshaft.

FIG. 1B is a schematic axial cross-sectional representation of preliminary composite driveshaft 10 during a second phase of the method, illustrating the modification of the shape of preliminary composite driveshaft 10 of FIG. 1A to form flexible composite driveshaft 24. After temporary mandrel 12 has been removed (e.g., by washing or other methods known in the art), the initial geometry of flexible elements 14 and 16 is modified to form flexible composite driveshaft 24 with flexible shaft elements 14 and 16 having a desired final geometry. The initial geometry of flexible elements 14 and 16 of preliminary composite driveshaft 10 can be modified by applying a load $F_2$ to preliminary composite driveshaft 10 to reduce radius $r_1$ of depression 22 to form a smaller radius $r_2$ sharp angle between elevations 18 and 20, which cannot be formed using direct one-step AFP. Although illustrated as having a concave smooth geometry with constant radius, it will be understood by one of ordinary skill in the art that depression 22 can be modified to form a concave sharp angle or any other concave shapes with variable radii and/or linear segments.

Load $F_2$ can be applied axially at ends of preliminary composite driveshaft 10 to compress preliminary composite driveshaft 10. In some embodiments, preliminary composite driveshaft 10 can be formed from a thermoplastic fiber tape, which can be heated to provide compliance upon application of load $F_2$. Heat can be applied to preliminary composite driveshaft 10 globally or locally (e.g., in the region of flexible elements 14 and 16 and/or 22). Structural modification of preliminary composite driveshaft 10 can be carefully controlled by only applying heat to regions where a change in shape is desired and not to regions where no change in shape is desired. In other embodiments, preliminary composite driveshaft 10 can be formed from a thermoset fiber tape that has only been partially cured to provide compliance upon application of load $F_2$.

In some embodiments, one or more clamps 26 can be placed around an outer diameter of preliminary composite driveshaft 10 to compress in the radial inward direction preliminary composite driveshaft 10 around the full or partial circumference to produce reduced radius $r_2$ or a sharp angle between adjacent elevations 18 and 20. A load $F_3$ directed radially inward toward axis A can be applied to clamps 26 to compress the outer diameter. In some embodiments, heat can be provided to a thermoplastic preliminary composite driveshaft 10 through clamps 26 to allow modification of the initial geometry. Clamps 26 can be placed in depression 22 at the location of radius $r_1$ and/or in transition regions on either side of elevations 18 and 20, and can have a geometry that matches a desired final geometry (i.e., $r_2$ or sharp angle) of depression 22.

In some embodiments, a cylindrical mandrel 28 can be provided within an inner diameter of preliminary composite driveshaft 10 to prevent closure of the inner diameter as the initial geometry of flexible shaft elements 14 and 16 is modified. Cylindrical mandrel 28 can be positioned in contact with depression 22, which can cause a radial height of elevations 18 and 20 from axis A to increase as preliminary composite driveshaft 10 is axially compressed. Alternatively, cylindrical mandrel can be spaced apart from depressions 22, which can cause a depth of depression 22 to increase (reduction in radially displacement from axis A) as preliminary composite driveshaft 10 is axially compressed. Cylindrical mandrel 28 can be removed when the final shape of flexible composite driveshaft 24 is provided (upon completion of modifying the initial geometry of flexible elements 14 and 16).

It will be understood by one of ordinary skill in the art that one or both loads $F_2$ and $F_3$ can be applied to preliminary composite driveshaft 10 to produce a desire final shape of flexible composite driveshaft 24. Loads $F_2$ and $F_3$ can be applied separately or simultaneously. Further, it will be understood that clamps 26 can be provided at multiple axial locations along the preliminary composite driveshaft to produce multiple depressions 22.

Once the final desired shape of flexible composite driveshaft 24 is achieved through modification, steps can be taken to retain the final geometrical shape of flexible composite driveshaft 24. For thermoplastic materials, retaining of the final shape can be accomplished by removing heat or cooling flexible composite driveshaft 24. For thermoset materials, additional curing steps as known in the art are required. Use of thermoplastic fiber tape may be preferable to reduce manufacturing costs and time.

Figure 2A:
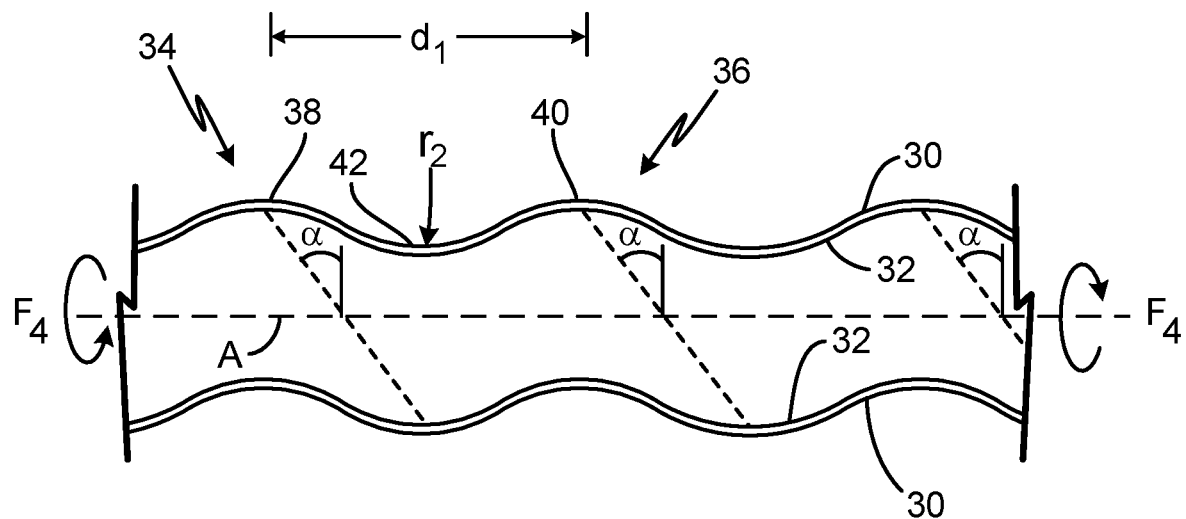
FIG. 2A is a schematic axial cross-sectional representation of an alternative preliminary composite driveshaft during a first phase of the method of the present disclosure in which the alternative preliminary composite driveshaft is formed on a mandrel.

FIG. 2A is a schematic representation of an alternative preliminary composite driveshaft during a first phase of the method of the present disclosure in which the alternative preliminary composite driveshaft is formed on a mandrel. FIG. 2A illustrates preliminary composite driveshaft 30 formed on temporary mandrel 32. A geometry of preliminary composite driveshaft 30 matches a geometry of temporary mandrel 32. Both preliminary composite driveshaft 30 and temporary mandrel 32 can be generally cylindrical and can include flexible elements 34 and 36, defined by regions of increased shaft diameter or radial extent with elevations 38 and 40 separated by depression 42. Flexible elements, including elevations 38 and 40 and depression 42, can be arranged in series along the axial cross-section of preliminary composite driveshaft 30, with elevations 38 and 40 extending radially outward from axis A and depression 42 extending radially inward toward axis A. As illustrated, elevations 38 and 40 and depression 42 can be formed by a helix wrapped around axis A, such that elevation 40 is a continuation of elevation 38. The helix wrapping geometry can be defined by non-zero angle α between diametric cross-sections and the slope of the elevations 38 and 40 and/or depressions 42. The angle α can be constant or variable along the axial direction and/or in the circumferential direction. Elevations 38 and 40 can form convex or otherwise curved protrusions having single or variable radii that extend from the generally cylindrical preliminary composite driveshaft 30. Elevations having angled peaks are also contemplated. Depression 42 can have a radius $r_3$ equal to or greater than a minimum radius for which fibers can be placed using AFP. Radius $r_3$ can set a distance $d_3$, which separates peaks of adjacent elevations 38 and 40. It will be understood that the number, shape, and location of flexible elements 34 and 36 can be varied and that the geometrical shapes of preliminary composite driveshaft 30 and the final flexible composite driveshaft (shown in FIG. 2B) are not limited to the embodiments shown, but that the disclosed method can be used to form any of a variety of shapes not capable of being formed using current AFP methods alone.

Preliminary composite driveshaft 30 is formed in a manner consistent with the formation of preliminary composite driveshaft 10 of FIG. 1A. Fiber tape is applied to temporary mandrel 32. The fiber tape can be wrapped around temporary mandrel 32 or otherwise placed to cover temporary mandrel 32. Multiple layers of fiber tape can be applied to temporary mandrel 32 to increase a thickness of preliminary composite driveshaft 30. It will be understood by one of ordinary skill in the art that fiber placement, including fiber direction and layering of fiber tape, can be optimized to meet local load conditions and can vary depending on the intended application. Fiber tape can have a thermoset or thermoplastic polymeric matrix. The material can be fully or partially cured following fiber layup using methods known in the art to provide structural rigidity. When the formation of preliminary composite driveshaft 30 is complete, temporary mandrel 32 can be removed (e.g., by washing or other methods known in the art), leaving the hollow preliminary composite driveshaft 30.

In some embodiments, a load can be applied to temporary mandrel 32 prior to and/or during the application of the fiber tape. As illustrated in FIG. 2A, torsional load (due to applied torque $F_4$) can be applied to twist temporary mandrel 32. Torque $F_4$ can be applied at one or both ends of temporary mandrel 32, as shown. Torque $F_4$ can be defined in the form of specified angular rotation and/or twisting moment. When applied at both ends of temporary mandrel 32, torque $F_4$ is applied in opposite directions at opposite ends. When the formation of preliminary composite driveshaft 30 is complete, load $F_4$ can be released, which can cause the structure to relax and compress causing the distance $d_3$ between elevations 38 and 40 to shrink and radius $r_3$ of depression 42 to be reduced. In some instances, radius $r_3$ of depression 42 can be reduced to a radius smaller than can be achieved with AFP. When temporary mandrel 32 is subsequently removed, preliminary composite driveshaft 30 can retain the relaxed geometry. In some embodiments, applying torque to temporary mandrel 32 can be sufficient to produce the desired final geometry of the flexible composite driveshaft and no further modification is necessary. In other embodiments, applying a torque to temporary mandrel 32 can be used to produce an intermediate composite driveshaft (not shown) having flexible elements 34 and 36 of an intermediate geometry different from the initial geometry of preliminary composite driveshaft 30 and the final geometry of flexible composite driveshaft (shown in FIG. 2B).

Figure 2B:
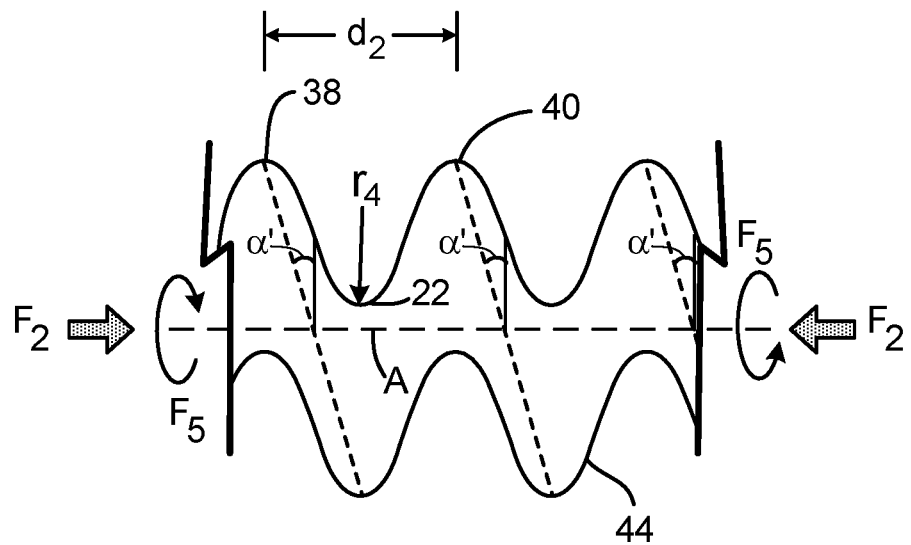
FIG. 2B is a schematic axial cross-sectional representation of the alternative preliminary composite driveshaft during the second phase of the method, illustrating the modification of the shape of the alternative preliminary composite driveshaft of FIG. 2A to form an alternative flexible composite driveshaft.

FIG. 2B is a schematic representation of the alternative preliminary composite driveshaft during the second phase of the method, illustrating the modification of the shape of the alternative preliminary composite driveshaft of FIG. 2A to form an alternative flexible composite driveshaft. After temporary mandrel 32 has been removed, the initial geometry of flexible elements 34 and 36 is modified to form flexible composite driveshaft 44 with flexible shaft elements 34 and 36 having a desired final geometry. The initial geometry of flexible elements 34 and 36 of preliminary composite driveshaft 30 can be modified by applying an axial load $F_2$ and torque $F_5$ to preliminary composite driveshaft 30 to reduce radius $r_3$ of depression 42 to form a smaller radius $r_4$ or sharp angle between elevations 38 and

40, which cannot be formed using AFP. Although illustrated as having a concave geometry, it will be understood by one of ordinary skill in the art that depression 42 can be modified to form a sharp angle.

Load $F_2$ can be applied axially at one or both ends of preliminary composite driveshaft 30 to compress preliminary composite driveshaft 30. Torque $F_5$ can be applied at one or both ends of preliminary composite driveshaft 10 to twist preliminary composite driveshaft 30. Torque $F_5$ can be applied in opposite directions at opposite ends of preliminary composite driveshaft 30 when applied at both ends. Load $F_2$ and torque $F_5$ can be applied to preliminary composite driveshaft 30 separately or simultaneously. As a result of applying of any or both load $F_2$ and torque $F_5$, the helix orientation can be changed from α to α' in the final shape shown in FIG. 2B. In some embodiments, preliminary composite driveshaft 30 can be formed from a thermoplastic fiber tape, which can be heated to provide compliance upon application of load $F_2$ or torque $F_5$. Heat can be applied to preliminary composite driveshaft 10 globally or locally (e.g., in the region of flexible elements 34 and 36 to allow for twisting and axial compression). Structural modification of preliminary composite driveshaft 30 can be carefully controlled by applying heat only to regions where a change in shape is desired and not to regions where no change in shape is desired. In other embodiments, preliminary composite driveshaft 10 can be formed from a thermoset fiber tape that has only been partially cured to provide compliance upon application of loads $F_2$ and $F_5$.

In some embodiments, one or more clamps (not shown) can be placed around an outer diameter of preliminary composite driveshaft 30 to compress preliminary composite driveshaft 30 around the full or partial circumference to produce reduced radius $r_4$ or sharp angle between adjacent elevations 38 and 40. As described with respect to modification of preliminary composite driveshaft 10, illustrated in FIG. 1B, a load directed radially inward toward axis A can be applied to the clamps. Additionally, heat can be provided to a thermoplastic preliminary composite driveshaft 30 through the clamps to allow modification of the initial geometry. In some embodiments, preliminary composite driveshaft 30 can be pressed into one or more molds to form flexible elements 34 and 36.

A cylindrical mandrel (not shown) can be provided within an inner diameter of preliminary composite driveshaft 30 to prevent closure of the inner diameter as the initial geometry of flexible shaft elements 34 and 36 is modified. The cylindrical mandrel can be positioned in contact with depression 32 or spaced apart from depression 32 as described with respect to the modification of preliminary composite driveshaft 10, illustrated in FIG. 1B. The cylindrical mandrel can be removed when the final shape of flexible composite driveshaft 44 is provided.

Figure 3:
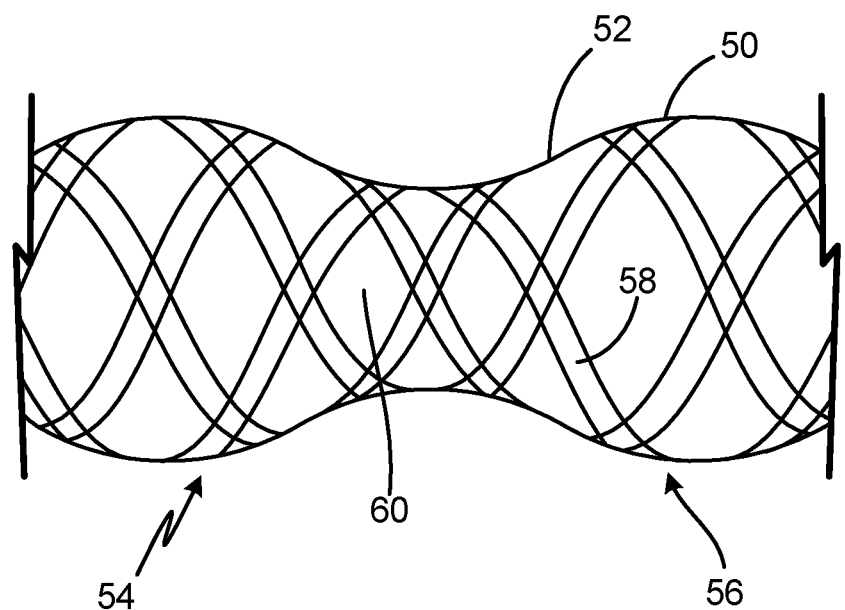
FIG. 3 is a schematic side-view representation of another alternative embodiment of a preliminary composite driveshaft.

FIG. 3 is a schematic side-view representation of another alternative embodiment of a preliminary composite driveshaft. FIG. 3 illustrates preliminary composite driveshaft 50 formed on temporary mandrel 52. The geometry of preliminary composite driveshaft 50 matches a geometry of temporary mandrel 52 and matches the geometry of preliminary composite driveshaft 10, illustrated in FIG. 1A, having similar flexible elements 54 and 56. Preliminary composite driveshaft 50 can have alternative geometrical shapes including, but not limited to, the shape of preliminary composite driveshaft 30, illustrated in FIG. 2A. Preliminary composite driveshaft 50 is distinguished from preliminary composite driveshafts 10 and 30 by fiber placement. As illustrated in FIG. 3, fiber tape 58 can be wrapped around temporary mandrel 52 to form a web structure with openings 60. Such web structure would be advantageous for very light-weight designs or loads that are very simple, e.g., only torque with little bending or axial forces, therefore not requiring supporting composite layers. It will be understood by one of ordinary skill in the art that the orientation of fiber tape 58, fiber tape overlap or weaving, and size of the openings 60 can vary depending on the application and as needed to provide high torsional stiffness with sufficient bending compliance to accommodate angular and axial misalignment and mass imbalance.

Preliminary composite driveshaft 50 can be formed with materials consistent with those disclosed for forming preliminary composite driveshafts 10 and 30. Axial or torsional stress can be applied to temporary mandrel 52 during fiber application as is disclosed with respect to the formation of preliminary composite driveshafts 10 and 30. Once preliminary composite driveshaft 50 is formed, temporary mandrel can be removed, and the shape of preliminary composite driveshaft 50 and flexible elements 54 and 56 can be modified. For a thermoset composite driveshaft, the preliminary shape can be partially cured and then fully cured once the final desired shape is achieved. For a thermoplastic composite driveshaft, the preliminary shape can be produced by conventional AFP methods with full or partial hardening. The thermoplastic driveshaft can be heated, either partially (e.g., in areas of specified deformation) or fully, to allow for modification and then fully hardened once the desired form is achieved. The shape of flexible elements 54 and 56 can be modified in a manner consistent with that disclosed with respect to preliminary composite driveshafts 10 and 30.

Figure 4:
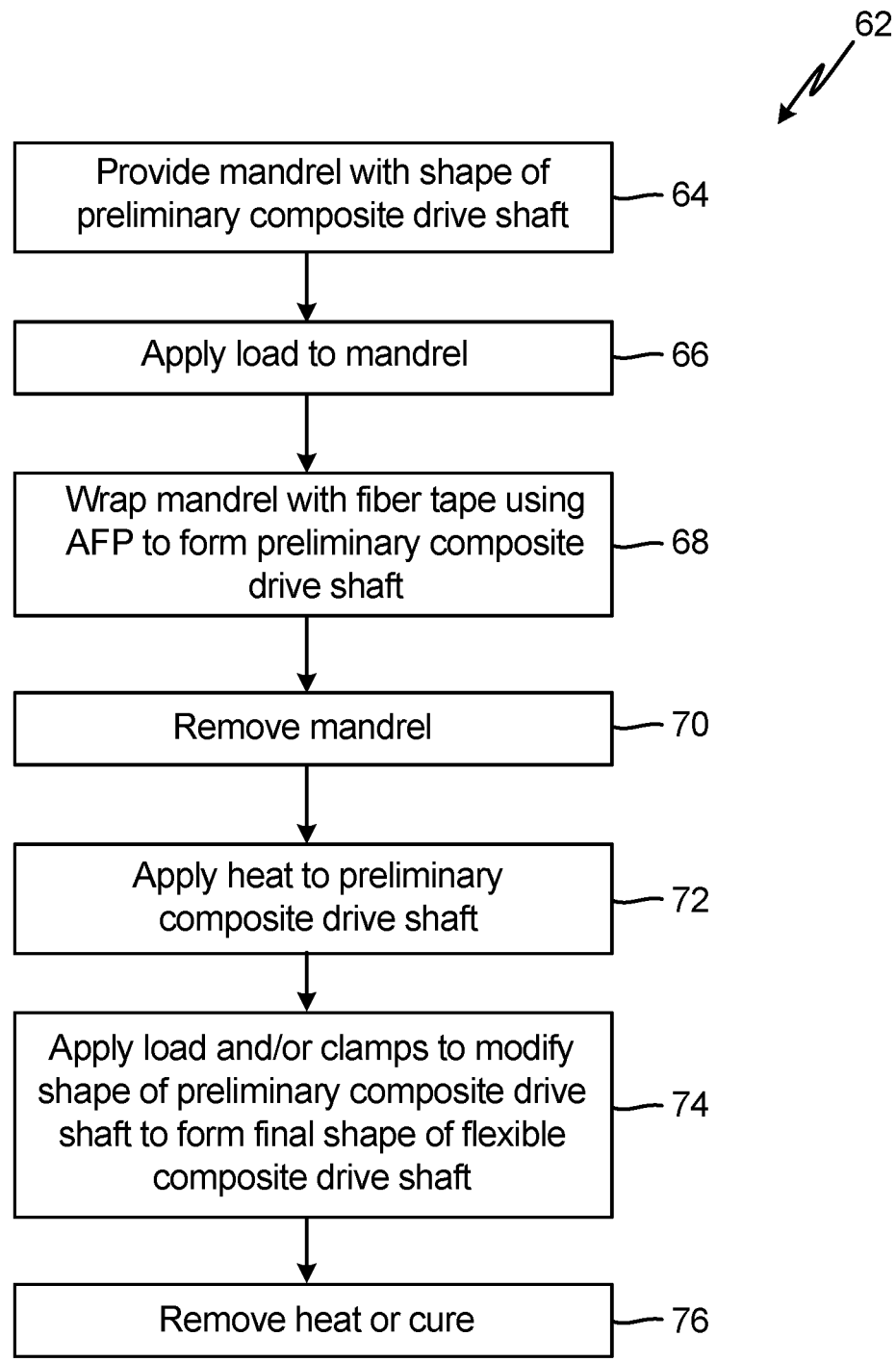
FIG. 4 is a flow chart of a method for forming a flexible composite driveshaft.

FIG. 4 is a flow chart of a method for forming the flexible composite driveshafts 24 and 44, illustrated in FIGS. 1B and 2B, and variations thereof, including a flexible composite driveshaft having a webbed structure as disclosed with respect to FIG. 3. As described with respect to the disclosure of FIGS. 1A, 1B, 2A, and 2B, method 62 includes in a first step providing a temporary mandrel having a shape of a preliminary composite driveshaft (step 64). In some embodiments, an axial load or torque can be applied to the temporary mandrel before fiber tape is applied to the temporary mandrel (optional step 66). Fiber tape is applied to the temporary mandrel using AFP in any manner as disclosed with respect to the formation of preliminary composite driveshafts 10, 30, and 50 to provide desired stiffness and compliance (step 68). Upon completion of fiber placement, the fiber tape can be partially cured for thermoset materials or solidified for thermoplastic materials and the temporary mandrel is removed using methods known in the art (step 70). In some embodiments, the preliminary composite driveshaft retains the shape of the temporary mandrel after the temporary mandrel has been removed. If a load has been applied to the temporary mandrel during fiber tape application, the preliminary composite driveshaft can take the shape of an intermediate composite driveshaft once the temporary mandrel is removed. The intermediate composite driveshaft can be formed by the relaxation of the structure once the load has been removed. The intermediate composite driveshaft can have flexible elements with intermediate geometries that are different from the initial geometries of the preliminary composite driveshaft and the final geometries of the flexible composite driveshaft. A load can be applied to the preliminary or intermediate composite driveshaft following removal of the temporary mandrel to further modify the shape of the driveshaft (step 74). Clamps to keep desired shape can also be applied at this step (step 74) if needed. Heat can be applied globally or locally to the preliminary and intermediate composite driveshafts formed from thermoplastic fiber tape to allow the shape of the driveshaft to be modified (optional step 72). Preliminary and intermediate composite driveshafts formed using a thermoset fiber tape can undergo a partial cure to provide structural rigidity while allowing for shape modification upon application of axial load and/or torque. Once the desired final shape of the flexible composite driveshaft is achieved, the material can be cured (e.g., heat can be removed for thermoplastic materials and partially cured thermoset materials can be fully cured) (step 76).

The disclosed method can be used to produce high performance components in which the positioning of fibers or fiber path can be locally optimized to meet varying load requirements while providing flexible elements with a relatively sharp angle or small corner radius to accommodate angular and axial misalignment and mass imbalance.

Summation

Any relative terms or terms of degree used herein, such as "substantially", "essentially", "generally", "approximately" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, transient alignment or shape variations induced by thermal, rotational or vibrational operational conditions, and the like. Moreover, any relative terms or terms of degree used herein should be interpreted to encompass a range that expressly includes the designated quality, characteristic, parameter or value, without variation, as if no qualifying relative term or term of degree were utilized in the given disclosure or recitation.

Discussion of Possible Embodiments

The following are non-exclusive descriptions of possible embodiments of the present invention.

A flexible composite driveshaft is formed by modifying the shape of a preliminary composite driveshaft. A fiber tape is applied to a temporary mandrel using automated fiber placement to form a preliminary composite driveshaft having a flexible shaft element with an initial geometry. The temporary mandrel from the preliminary composite driveshaft is removed and the initial geometry of the flexible shaft element is modified to form the flexible composite driveshaft having a flexible shaft element with a final geometry.

The process for forming the flexible composite driveshaft of the preceding paragraph can optionally include, additionally and/or alternatively, any one or more of the following features, configurations, additional components, and/or steps:

The process of preceding paragraph, wherein the flexible shaft element can include a transition region in an axial cross-section of the preliminary composite driveshaft with the transition region having a first radius.

The process any of the preceding paragraphs, wherein modifying the initial geometry of the flexible shaft element can include applying a load to the preliminary composite driveshaft to reduce a size of the first radius.

The process any of the preceding paragraphs, wherein applying a load can include applying an axial load to ends of the preliminary composite driveshaft.

The process any of the preceding paragraphs can further include providing one or more clamps in the transition region and applying a radially inward load to the clamps to reduce the size of the first radius.

The process any of the preceding paragraphs, wherein applying a load can include applying torque to the preliminary composite driveshaft.

The process any of the preceding paragraphs, wherein applying a load can further include applying an axial load to the preliminary composite driveshaft.

The process any of the preceding paragraphs can further include providing a cylindrical mandrel within an inner diameter of the preliminary composite driveshaft to prevent closure of the inner diameter of the preliminary composite shaft during the step of modifying the initial geometry of the flexible shaft element, and removing the cylindrical mandrel upon completion of modifying the initial geometry of the flexible shaft element.

The process any of the preceding paragraphs, wherein the cylindrical mandrel can be positioned in contact with the inner diameter of the preliminary composite drive shaft.

The process any of the preceding paragraphs can further include applying a load to the temporary mandrel prior to applying the fiber tape to the temporary mandrel.

The process any of the preceding paragraphs, wherein applying a load to the temporary mandrel can include elongating the temporary mandrel.

The process any of the preceding paragraphs, wherein applying a load to the temporary mandrel can include applying torque to the temporary mandrel.

The process any of the preceding paragraphs, wherein removing the temporary mandrel produces an intermediate composite driveshaft with the flexible element having an intermediate geometry different from the initial and final geometries.

The process any of the preceding paragraphs, wherein the fiber tape can be a thermoplastic material and wherein modifying the initial geometry of the flexible element comprises applying heat to the preliminary composite driveshaft.

The process any of the preceding paragraphs, wherein heat can be applied locally to the transition region.

The process any of the preceding paragraphs, wherein heat can be applied through a clamp positioned in the transition region.

The process any of the preceding paragraphs, wherein the fiber tape can be a thermoset material and wherein the thermoset material is partially cured prior to modifying the initial geometry of the flexible element and fully cured when the final geometry of the flexible element is produced to form the final composite driveshaft.

The process any of the preceding paragraphs, wherein the preliminary composite driveshaft can include a plurality of flexible elements arranged in series along an axis of the preliminary composite driveshaft, with adjacent flexible elements separated by at least one transition region having a first radius.

The process any of the preceding paragraphs, wherein the flexible elements can together form a helix.

The process any of the preceding paragraphs, wherein the fiber tape can be wrapped around the temporary mandrel to form a web structure with openings.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A process for forming a flexible composite driveshaft, the process comprising:
 applying a fiber tape to a temporary mandrel using automated fiber placement to form a preliminary composite driveshaft having a flexible shaft element with an initial geometry, wherein the flexible shaft element comprises a transition region in an axial cross-section of the preliminary composite driveshaft, the transition region having a first radius;
 removing the temporary mandrel from the preliminary composite driveshaft;
 modifying the initial geometry of the flexible shaft element to form the flexible composite driveshaft having a flexible shaft element with a final geometry wherein modifying the initial geometry of the flexible shaft element comprises at least one of:
  applying a load to the preliminary composite driveshaft to reduce a size of the first radius and wherein applying a load comprises at least one of:
   applying an axial load to ends of the preliminary composite driveshaft; and
   applying torque to the preliminary composite driveshaft; and
  applying a load to the temporary mandrel prior to applying the fiber tape to the temporary mandrel.

2. The process of claim 1, wherein applying a load comprises applying an axial load to ends of the preliminary composite driveshaft.

3. The process of claim 1, and further comprising:
 providing one or more clamps in the transition region; and
 applying a radially inward load to the clamps to reduce the size of the first radius.

4. The process of claim 1, wherein applying a load comprises applying torque to the preliminary composite driveshaft.

5. The process of claim 4, wherein applying a load further comprises applying an axial load to the preliminary composite driveshaft.

6. The process of claim 1, and further comprising:
 providing a cylindrical mandrel within an inner diameter of the preliminary composite driveshaft to prevent closure of the inner diameter of the preliminary composite shaft during the step of modifying the initial geometry of the flexible shaft element; and
 removing the cylindrical mandrel upon completion of modifying the initial geometry of the flexible shaft element.

7. The process of claim 6, wherein the cylindrical mandrel is positioned in contact with the inner diameter of the preliminary composite drive shaft.

8. The process of claim 1, and further comprising applying a load to the temporary mandrel prior to applying the fiber tape to the temporary mandrel.

9. The process of claim 1, wherein applying a load to the temporary mandrel comprises elongating the temporary mandrel.

10. The process of claim 1, wherein applying a load to the temporary mandrel comprises applying torque to the temporary mandrel.

11. The process of claim 1, wherein removing the temporary mandrel or removing the load applied to the temporary mandrel produces an intermediate composite driveshaft with the flexible element having an intermediate geometry different from the initial and final geometries.

12. The process of claim 1, wherein the fiber tape is a thermoplastic material and wherein modifying the initial geometry of the flexible element comprises applying heat to the preliminary composite driveshaft.

13. The process of claim 12, wherein heat is applied locally to the transition region.

14. The process of claim 13, wherein heat is applied through a clamp positioned in the transition region.

15. The process of claim 1, wherein the fiber tape is a thermoset material and wherein the thermoset material is partially cured prior to modifying the initial geometry of the flexible element and fully cured when the final geometry of the flexible element is produced to form the final composite driveshaft.

16. The process of claim 1, wherein the preliminary composite driveshaft comprises a plurality of flexible elements arranged in series along an axis of the preliminary composite driveshaft, wherein adjacent flexible elements are separated by at least one transition region having a first radius.

17. The process of claim 16, wherein the flexible elements together form a helix.

18. The process of claim 1, wherein the fiber tape is wrapped around the temporary mandrel to form a web structure with openings.

19. The process of claim 1, wherein the initial geometry of the flexible shaft element is modified after the temporary mandrel is removed.

* * * * *